United States Patent [19]

Harle

[11] Patent Number: 4,506,908
[45] Date of Patent: Mar. 26, 1985

[54] LOAD SUPPORTING BEAMS

[75] Inventor: Christopher N. Harle, Rothwell, England

[73] Assignee: Norde Suspensions Limited, England

[21] Appl. No.: 498,081

[22] Filed: May 25, 1983

[30] Foreign Application Priority Data

Jun. 5, 1982 [GB] United Kingdom ............... 8216428

[51] Int. Cl.³ .............................................. B60G 5/00
[52] U.S. Cl. .................................... 280/677; 105/414; 296/204
[58] Field of Search ............... 296/203, 204, 205, 209, 296/187; 105/399, 413, 414–419; 280/786, 677, 797, 800

[56] References Cited

U.S. PATENT DOCUMENTS

| 1,217,685 | 2/1917 | Barks | 105/418 |
| 1,224,790 | 5/1917 | Roa | 105/414 |
| 1,801,333 | 4/1931 | Clasen | 105/414 |
| 1,821,151 | 9/1931 | Gilpin | 105/414 |
| 2,083,553 | 6/1937 | Blomberg | 105/418 |
| 3,784,131 | 1/1974 | Stratford | 280/677 |
| 3,954,066 | 5/1976 | Heap | 105/416 |
| 4,353,311 | 10/1982 | Jantzen | 105/413 |

*Primary Examiner*—Richard A. Bertsch
*Attorney, Agent, or Firm*—King, Liles & Schickli

[57] ABSTRACT

The invention relates to load bearing beams, and has for its object the provision of such beam of high strength and hence high load carrying capacity with relatively low weight, such as would be suitable for use in vehicles. The objective is met by a construction comprising a beam-like member formed by two spaced plate-like members, each of which has an outwardly directed flange to one side and an inwardly directed flange to the other side, to be of generally Z-shaped cross-section, said two plate-like members being secured to and spaced by internal cross-members. Thus, with the outwardly and inwardly directed flanges respectively being to the same side of the plate-like members an effective box-like structure is formed within which lie the spacing internal cross-members.

10 Claims, 3 Drawing Figures

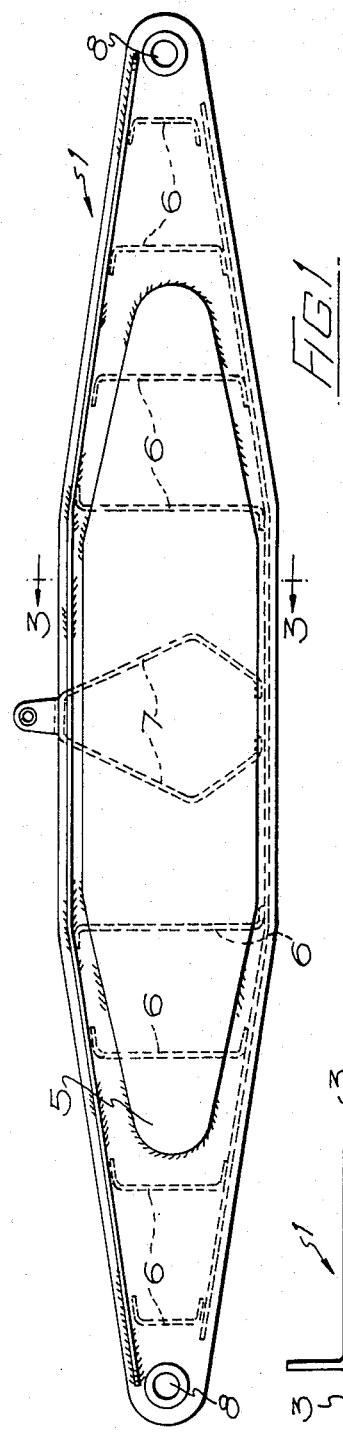
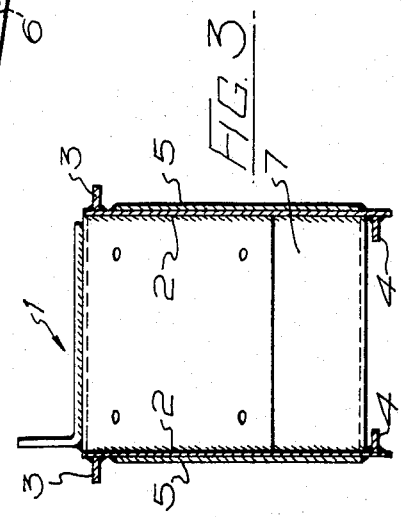
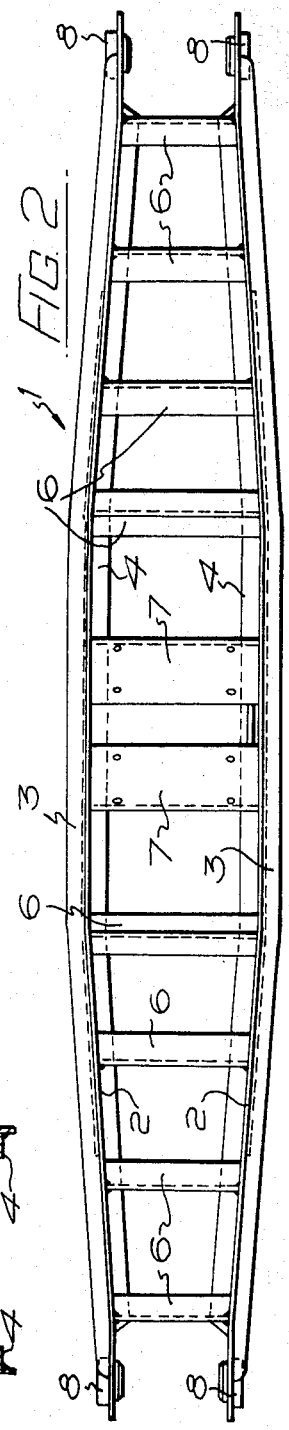

LOAD SUPPORTING BEAMS

This invention relates to load bearing beams and is particularly though not necessarily exclusively concerned with load bearing beams as would be used in vehicles such as lorries or trailers for vehicles.

With the need to increase efficiency and cost effectiveness, there is a growing tendency to increase the load carrying capacities of lorries or trailer vehicles. However to prevent undue damage to the road surface, current legislation imposes a maximum load that can be carried by a single lorry or tractor/trailer unit, and additionally imposes a maximum load per axle below the load carrying area. This has led to the introduction of lorries or trailer units with two or more axles. However, as the number of axles increases then so has increased the number of suspension units to either side of the lorry or the trailer unit. This then leads to an increase in the unladen weight of the vehicle with a consequent reduction in the maximum weight of goods that can be transported. Thus as a means of reducing the unladen weight, it is common place to link the corresponding ends of adjacent axles in a double-axle or tri-axle system by beam-like members and whereby a single suspension system acting on each beam can effectively secure adjacent axles to the vehicle/trailer frame or chassis.

Hitherto such connecting beams and which of necessity must be of high strength have themselves added considerably to the unladen weight of the vehicle with its effect on load carrying capacity.

It is the object of the present invention to provide a beam-like member that is of high strength and of low weight.

According to the present invention a beam-like member comprises two spaced plate-like members, each of which has an outwardly directed flange to one side and an inwardly directed flange to the other side, to be of generally Z-shaped cross-section, said two plate-like members being secured to and spaced by internal cross-members.

With any given relatively high strength metal such as steel or an appropriate aluminium alloy, the thickness of the metal used can be reduced considerably because of the inherent strength generated by the cross-sectional shape of each plate-like member. This then allows, for any given strength requirement, a considerable reduction in the weight of the beam-like member by being able to use a much lower weight of metal in the plate-like members.

Preferably the two plate-like members and the respective flanges are separately formed and the flanges secured to the plate-like members, e.g., by welding. It is further preferred that the plate-like members are assembled such that the inwardly directed flanges both lie to the same side of the beam-like member with the outwardly directed flanges both being at the opposite side. This produces an effective box-like structure within which lie the spacing internal cross-members.

Thus, in its application to vehicles such as lorries or trailers for vehicles, each end of the beam-like member can be provided with a pivot hole or other suitable attachment for securing to an axle, and there can be provided part way along the length of the beam-like member a mounting to which can be secured appropriate suspension means and whereby the adjacent axles of a two or three axle system can be effectively sprung from the underside of the vehicle or vehicle trailer.

In such an application, care has to be taken in determining the optimum relationship between the weight of the beam-like member and its strength, tire clearance, and to ensure that debris cannot collect within the beam-like member, which can have a harmful effect on any spring arrangement secured to or within the beam, and would significantly affect accurate monitoring of the vehicle load when electronic axle weighing systems are employed. Thus it is preferred that when used in a vehicle, the beam-like member is disposed such that the outwardly extending flanges are uppermost, and that the relationship between the mean depth of the plate-like members and the outwardly extending flanges is in the range of ratios 20:1 to 11:1 and with the inwardly extending flanges is in the range of ratios 10:1 to 5.5:1.

To increase the effectiveness of the beam-like member in terms of resisting fatigue failure due to imposed fluctuating vertical loads and resisting static loads, it is highly desirable to avoid any radiused connection between the flanges and the plate-like members, as such radii would cause the beam-like member to ripple along its edge under tension and thus increase the possibility of failure. It is also desirable to ensure that the point of attachment of the flanges is spaced from the respective edges of the plate-like members.

Again to reduce the possibility of premature failure, it is preferred that there is no direct connection between the internal cross-members and the inwardly directed flanges of the plate-like members, by providing a gap between the lower edges of the cross-members and the lower flanges, and to avoid any lateral securing, e.g., by welding, between the cross-members and the flanges of the plate-like members.

To lighten the weight of the beam-like member further, it is preferred that each internal cross-member is provided with through-holes of a size sufficient to significantly reduce weight but not so large as to seriously detract from the strength of the cross-members.

One embodiment of the invention will now be described with reference to the accompanying drawings, in which:

FIG. 1 is a side elevation of a load supporting beam according to the invention in a form for use as part of the suspension system of a vehicle;

FIG. 2 is a plan view of FIG. 1; and

FIG. 3 is a section on the line 3—3 of FIG. 1.

In the drawings, a load supporting beam 1, for use in a suspension system for trailer vehicles, has two spaced plate members 2 each having an outwardly directed flange 3 towards one (upper) edge, and an inwardly directed flange 4 towards the other (lower) edge so that each plate is of generally Z-shaped cross-section. Each flange 3, 4 is formed separately from the side plates 2 and secured in place by welding. Externally, each side plate 2 is overlaid by a facing plate 5, for added rigidity.

The two Z-shaped side plates are secured together in spaced relationship by internal cross-members 6 welded to the plates 2, whereby to produce an effective elongate box-like structure. To reduce the weight of the beam without impairing its strength characteristics, each cross-member 6 is provided with one or more holes.

To enable the beam to be secured to the spring means of a vehicle, further cross-members 7 can be provided between, and welded to, the plates 2, which facilitate the securing of the beam to the suspension and serve additionally to further secure the plates 2 in spaced relationship.

Towards the outer ends of the beams, bosses 8 with through holes are formed, and whereby the beam can be pivotally or resiliently secured to the axles (not shown) of a trailer vehicle.

In its application to vehicles, care must be taken to determine the optimum relationship between the weight of the beam and its strength, and to ensure that debris cannot collect within the beam, which can have a harmful effect on the particular spring means of the suspension system, and significantly affect accurate monitoring of the vehicle load. Hence, as shown, the outwardly directed flanges 3 are at the upper edges of the plate 2 and the inwardly directed flanges at the lower edges, with the relationship of the mean depth of the plates 2 to the width of the flanges 3 in the ratio 11:1, and in relation to the flanges 4 is 5.5:1.

As shown, the flanges 3 and 4 are secured to the plates 2 spaced from the respective edges, and the securing of the flanges in place is by edge abutting connection. This is highly desirable as a means of resisting premature failure of the beam due to imposed fluctuating vertical loads, and so avoid any tendancy for the beam to ripple along its edges under tension, and which would again lead to premature failure. In addition, and again as shown it is highly advisable to ensure that the cross-members 6 and 7 are not in contact with or secured in any way to the inwardly directed flanges 4, with a positive gap being provided between the bottom edges of the crossmembers 6, 7 and the flanges 4.

I claim:

1. In a road vehicle suspension system a beam-like member for securing adjacent axles of a multiple axle system, said beam comprising two spaced plate-like members, each of which has an outwardly directed flange to one side and an inwardly directed flange to the other side, to be of generally Z-shaped cross-section, said two plate-like members being secured to and spaced by internal cross-members.

2. A beam-like member as in claim 1, wherein the respective flanges are separately formed and the flanges secured to the plate-like members.

3. A beam-like member as in claim 1, wherein the plate-like members are assembled such that the inwardly directed flanges both lie to the same side of the beam-like member with the outwardly directed flanges both being at the opposite side.

4. A beam-like member as in claim 1, in its application to vehicles, wherein each end of the beam-like member is provided with a pivot hole or other suitable attachment for securing to an axle.

5. A beam-like member as in claim 4, wherein there is provided part way along the length of the beam-like member a mounting to which can be secured appropriate suspension means.

6. A beam-like member as in claim 4, wherein the beam-like member is disposed such that the outwardly extending flanges are uppermost.

7. A beam-like member as in claim 4, wherein the relationship between the mean depth of the plate-like members and the outwardly extending flanges is in the range of ratios 20:1 to 11:1 and with the inwardly extending flanges is in the range of ratios 10:1 to 5.5:1.

8. A beam-like member as in claim 1, wherein is provided an edge abutting connection of the flanges to the plate-like member.

9. A beam-like member as in claim 1, wherein the point of attachment of the flanges is spaced from the respective edges of the plate-like members.

10. A beam-like member as in claim 1, wherein a gap is provided between the lower edges of the cross-members and the lower flanges.

* * * * *